(12) United States Patent
Lang et al.

(10) Patent No.: US 11,575,297 B2
(45) Date of Patent: Feb. 7, 2023

(54) ELECTRIC MACHINE WITH AN EXTENDED SURFACE COOLER

(71) Applicant: ZF Friedrichshafen AG, Friedrichshafen (DE)

(72) Inventors: Martin Lang, Wegscheid (DE); Thomas Auer, Passau (DE); Sebastian Paulik, Tiefenbach (DE); Harald Wendl, Vilshofen (DE); Gerhard Obermaier, Tiefenbach (DE); Maria Lang, Hauzenberg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 204 days.

(21) Appl. No.: 16/877,917

(22) Filed: May 19, 2020

(65) Prior Publication Data
US 2020/0373816 A1 Nov. 26, 2020

(30) Foreign Application Priority Data
May 20, 2019 (DE) ............... 10 2019 207 323.9

(51) Int. Cl.
*H02K 9/197* (2006.01)
*H02K 5/20* (2006.01)

(52) U.S. Cl.
CPC ............. *H02K 9/197* (2013.01); *H02K 5/203* (2021.01)

(58) Field of Classification Search
CPC ............ H02K 9/197; H02K 1/20; H02K 5/20; H02K 5/203
See application file for complete search history.

(56) References Cited

U.S. PATENT DOCUMENTS

| 3,566,165 A * | 2/1971 | Lohr ................... B60L 15/2009 310/67 R |
| 4,739,204 A | 4/1988 | Kitamura et al. |
| 2005/0093385 A1* | 5/2005 | Kuhn ....................... H02K 5/20 310/90 |
| 2009/0108715 A1* | 4/2009 | Sopp ....................... H02K 9/227 310/60 A |
| 2016/0372986 A1* | 12/2016 | Brune .................. H02K 5/1732 |

FOREIGN PATENT DOCUMENTS

| CN | 109301960 A * | 2/2019 | ............... H02K 1/32 |
| DE | 102013205132 A1 * | 9/2014 | ............... H02K 1/20 |
| EP | 0231785 A2 | 8/1987 | |

OTHER PUBLICATIONS

Chen (CN 109301960 A) English Translation (Year: 2019).*
Dassler (DE 102013205132 A1) English Translation (Year: 2014).*

* cited by examiner

*Primary Examiner* — Tulsidas C Patel
*Assistant Examiner* — Robert E Mates
(74) *Attorney, Agent, or Firm* — Dority & Manning, P.A.

(57) ABSTRACT

An electric machine includes a stator (1) and a rotor (2), which are arranged in a housing (3). A liquid cooling jacket is configured for cooling the stator (1). At least one extended surface cooler (10), which is connected to the liquid cooling jacket via a housing wall, is provided in an interior of the housing (3) for direct cooling of components arranged in the interior of the housing (3). Moreover, an axle drive of a vehicle may include the electric machine.

9 Claims, 3 Drawing Sheets

ELECTRIC MACHINE WITH AN EXTENDED SURFACE COOLER

CROSS-REFERENCE TO RELATED APPLICATION

The present application is related and has right of priority to German Patent Application No. 10 2019 207 323.9 filed on May 20, 2019, which is incorporated by reference in its entirety for all purposes.

FIELD OF THE INVENTION

The present invention relates generally to an electric machine including a stator and a rotor. Moreover, the invention relates generally to a vehicle including the electric machine.

BACKGROUND

Publication EP 0 231 785 A2, for example, describes a vehicle including a generator. In order to cool the stator of the generator, a jacket cooling is provided, which is acted upon with coolant from the vehicle. The jacket cooling can provide, via additional heat-conducting elements, an indirect cooling of further components. Moreover, an air blower is driven, which generates a cooling air flow.

Since it is crucial for the performance of an electric machine to sufficiently dissipate the generated heat, a sufficient liquid cooling is necessary, in particular, for electric machines that are operated as a motor. In addition to the stator, which is thermally managed with the aid of a jacket cooling, further considerable heat-producing components are also provided in the interior of the electric machine, which absolutely must be cooled. The cooling of components provided in the interior of the electric machine is structurally complex.

SUMMARY OF THE INVENTION

Example aspects of the present invention provide an electric machine of the type described at the outset and an axle drive including the electric machine, in the case of which a particularly effective liquid cooling is implemented in a structurally simple and cost-effective way.

An electric machine is therefore provided, for example, as an axle drive including a stator and a rotor, which are arranged in a housing. A liquid cooling is provided, which encompasses at least one jacket cooling enclosing the stator, so that the stator is coolable at a lateral region of the stator. In order to further optimize and structurally simply configure the liquid cooling, at least one extended surface cooler, or the like, which is connected to the liquid cooling via the housing wall, is provided in the interior of the housing for the direct cooling of components arranged in the interior of the housing.

In this way, it is not only possible to cool the stator via the lateral surface of the stator, but rather it is also possible to sufficiently cool the components generating considerable heat in the interior with the aid of the extended surface cooler provided, in an additionally structurally simple and cost-effective manner. Due to the fact that the extended surface cooler is connected to the existing liquid cooling and, in the immediate surroundings in the interior of the housing, is associated with the components to be cooled, a direct cooling can take place without additional heat-conducting components. Accordingly, the emitted heat is directly absorbed and particularly effectively dissipated by the coolant. The effective and installation space-favorable cooling according to example aspects of the invention is suited, in particular, for use in electric machines as axle drives for vehicles, since the available installation space is low and the cooling demand in order to apply maximum power is considerable.

Within the scope of an advantageous example embodiment of the invention, the extended surface cooler is designed, with respect to a spatial basic shape of the extended surface cooler, to be, for example, ring segment-shaped, and is arranged coaxially to the axis of rotation of the rotor of the electric machine. Due to the practically, in principle, ring segment-shaped example embodiment of the extended surface cooler, a ring-segment flow in the interior of the housing around the rotor axis is made possible and, therefore, the surrounding components are effectively cooled. Moldings or openings onto the ring segment shaped basic shape are readily conceivable, in order to provide, for example, the inflow and outflow of the coolant and/or also in order to adapt the extended surface cooler, with the cooling surface area of the extended surface cooler, to certain predefined geometric shapes of the components to be cooled. Since the connection of the ring segment-shaped extended surface cooler takes place via the housing wall, this type of accessory cooling is particularly simple to integrate into the electric machine without the need for a greater design complexity.

As described above, the existing liquid cooling of a vehicle can be concurrently utilized as a coolant supply for the extended surface cooler. It is also possible to provide a separate liquid cooling, as necessary, without losing the fundamental advantages of the invention.

The coolant inflow and outflow for the extended surface cooler can be implemented in that the coolant inflow and outflow of the extended surface cooler, which is connected to the liquid cooling, is integrated into a housing end wall. The coolant inflow and outflow are arranged on a common circumferential path of the housing end wall, so that a ring-segment flow in the extended surface cooler is implemented. Preferably, the ring segment can be designed nearly over the entire circumference, to the greatest extent possible, so that the ring-segment flow can also spread nearly over the entire circumference and can sufficiently cool the facing components.

A structurally advantageous integration of the coolant supply into the extended surface cooler of the electric machine can be implemented in that the coolant inflow includes a first coolant hole and a second coolant hole, which is connected to the first coolant hole. The first coolant hole is connected to the jacket cooling and extends essentially axially at the lateral region through the housing wall. The second coolant hole is connected to the extended surface cooler and extends radially through the housing end wall. Accordingly, the inlet holes are particularly simple to provide, due to the position of the inlet holes at the lateral region of the housing and/or at the face end of the housing, and so a retrofitting of already produced electric machines is also readily possible. In order to discharge coolant, a coolant outflow of the extended surface cooler is connected to a third coolant hole, which extends, for example, radially through the housing end wall and opens into an outflow hole, in order to guide the coolant back to the liquid cooling.

The extended surface cooler provided in the case of the proposed electric machine can assume any type of spatial configuration, in order to be adapted to the particular available interior space region of the electric machine. For example, the extended surface cooler can include multiple sections as the cooling surface area, which are essentially associated directly with the particular components to be cooled, in order to allow for a direct cooling via absorption of the thermal radiation.

For example, the sections of the cooling surface area of the extended surface cooler, which have been provided, can be associated with, in particular, the rotor, the winding overhangs, the bearings of the rotor, or the like, as components to be cooled, and, therefore, can establish the structural shape of the extended surface cooler. For example, both housing face end areas can be equipped with an extended surface cooler, so that the components are effectively directly cooled on both sides in the interior.

One further example aspect of the present invention relates to an axle drive of a vehicle, in particular a motor vehicle, including the above-described electric machine. The electric machine is therefore provided as a wheel drive of the axle drive of the vehicle, or the like. Overall, this yields the above-described advantages as well as further advantages.

BRIEF DESCRIPTION OF THE DRAWINGS

The present invention is explained in greater detail in the following with reference to the drawings. Wherein.

DETAILED DESCRIPTION

Figure 1:
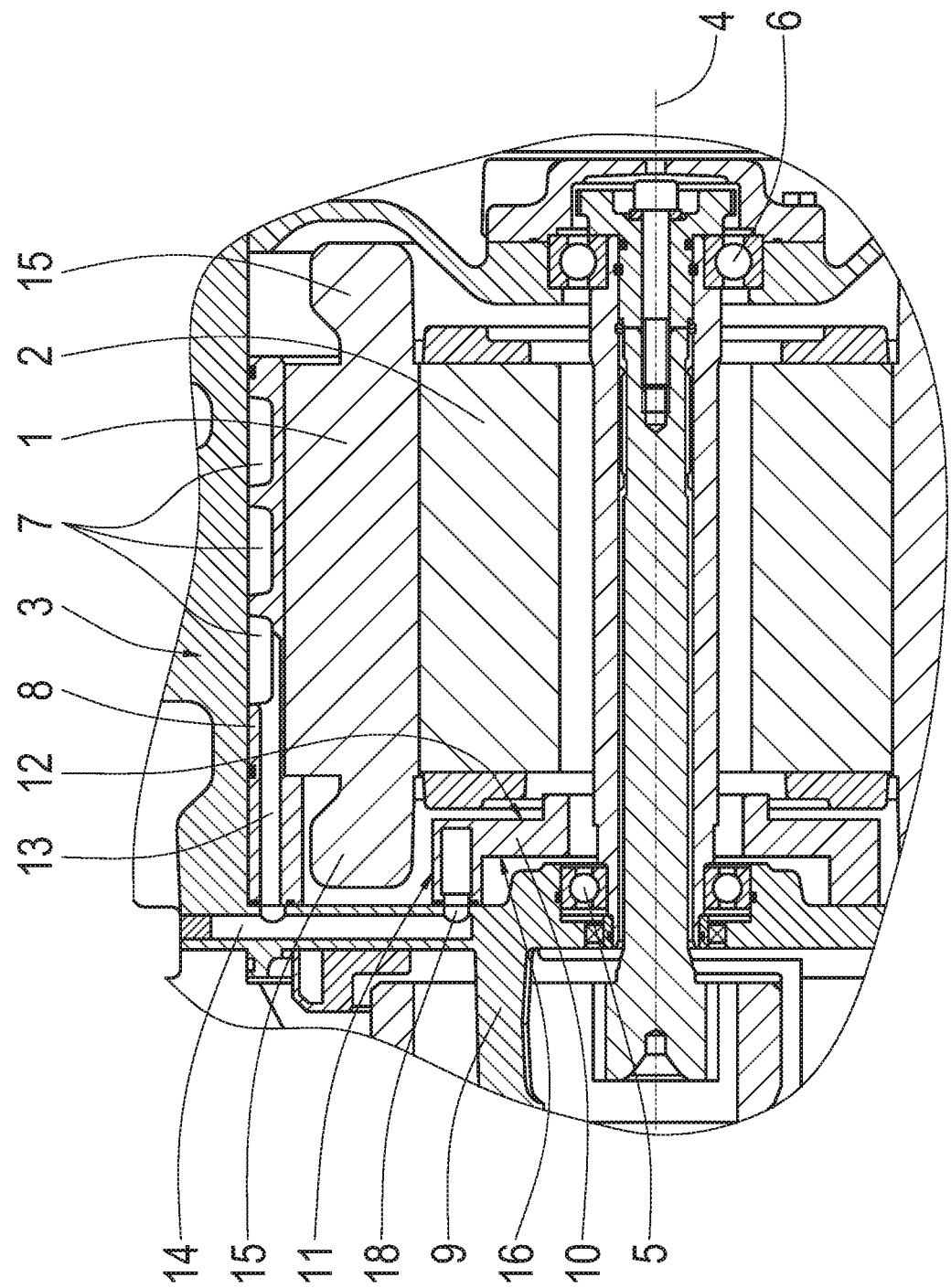
FIG. 1 shows a cut part view of one possible example embodiment variant of an electric machine according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
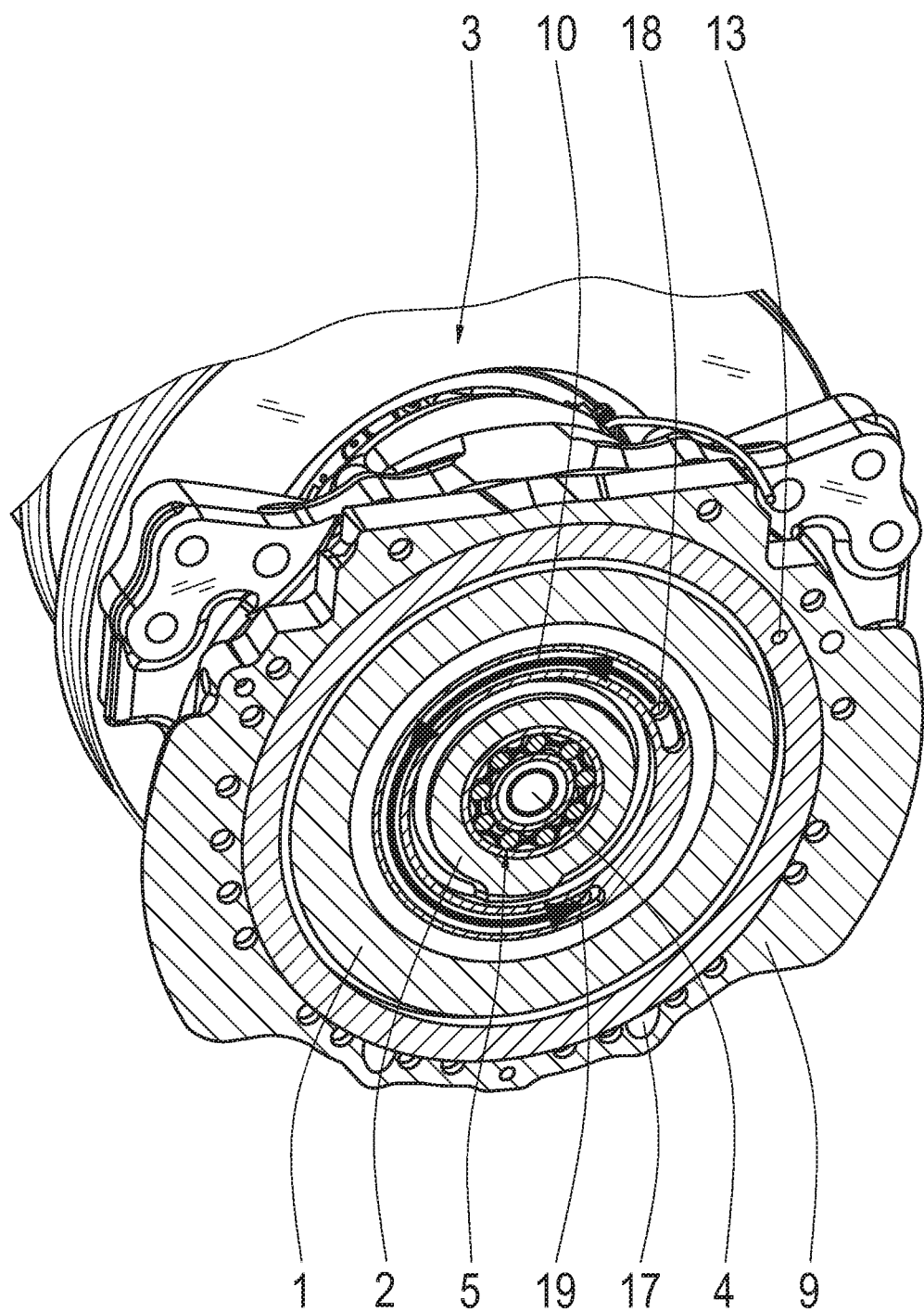
FIG. 2 shows a transversely cut, three-dimensional view of the example electric machine.
Figure 3:
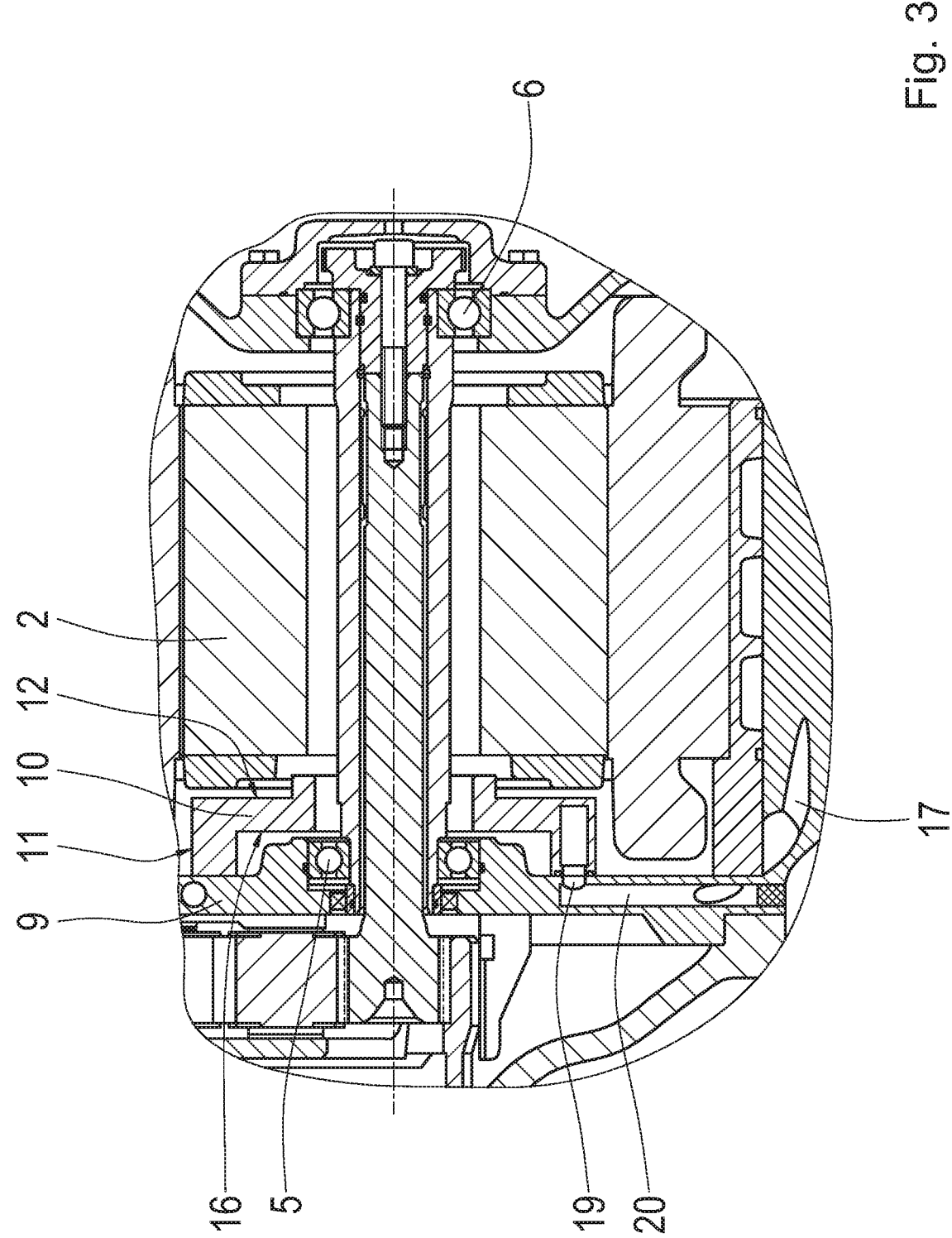
FIG. 3 shows one further cut part view of the example electric machine according to FIG. 1.

FIGS. 1 through 3 show, by way of example, various views of one possible example embodiment variant of an electric machine according to the invention for use in a vehicle, in particular in a motor vehicle. The electric machine includes a stator 1 and a rotor 2, which are arranged in a housing 3. The rotor 2 rotates about an axis of rotation 4 and drives a vehicle wheel, wherein the rotor 2 is supported in the housing 3 via a first rotor bearing 5 and a second rotor bearing 6.

In order to cool the stator 1, which extends around the rotor 2 and is fixedly connected to the housing 3, a jacket cooling is provided, as liquid cooling, which is implemented with the aid, for example, of multiple helical cooling ducts 7, which extend through a cooling bush 8 and extend around the stator 1.

In order to configure the liquid cooling to be more effective, and to implement the liquid cooling in a particularly cost-effective and structurally simple manner, it is provided that an extended surface cooler 10, which is connected to the liquid cooling via a housing end wall 9, is provided in the interior of the housing 3 for the direct cooling of components of the electric machine arranged in the interior of the housing 3.

The extended surface cooler 10 is designed, with respect to its basic shape, to be, for example, ring segment-shaped, and extends coaxially to the axis of rotation 4 of the rotor 2. The extended surface cooler 10 includes multiple sections 11, 12, 16 as a cooling surface area. The ring segment shape of the extended surface cooler 10 extends around the rotor 2 at an angle preferably of less than three hundred and sixty degrees (360°).

As is apparent, in particular, from FIGS. 1 and 2, the coolant supply and/or the connection of the liquid cooling to the extended surface cooler 10 takes place in such a way that the coolant supply includes a first coolant hole 13 and a second coolant hole 14, which is connected to the first coolant hole 13. The first coolant hole 13 extends axially in the lateral housing surface and is connected to the cooling bush 8 of the jacket cooling. The second coolant hole 14 is connected to the coolant inflow 18 of the extended surface cooler 10 and extends radially through the housing end wall 9. Sealing means, for example, O-rings, or the like, can be provided in the transition area between the first coolant hole 13 and the second coolant hole 14. In order to discharge coolant, a coolant outflow 19 of the extended surface cooler 10 is connected to a third coolant hole 20, which extends radially through the housing end wall 9 and opens into an outflow hole 17.

The ring segment-shaped profile of the extended surface cooler 10 is apparent, in particular, from FIG. 2. From the cross-sectional representation according to FIG. 2, in the area of the wheel end of the electric machine as an axle drive, it becomes clear where the coolant inflow 18 and the coolant outflow 19 of the extended surface cooler 10 are arranged on the housing end wall 9. These are arranged spaced apart from one another, in order to allow for a maximum ring-segment flow over the circumference on a common circumferential path.

It is apparent, in particular, from FIGS. 1 and 3, that the ring segment-shaped extended surface cooler 10 includes a circumferential cooling surface area. Inter alia, a first section 11 of the cooling surface area essentially directly faces the winding overhangs 15 arranged on a face end of the stator 1, in order to directly cool these via the absorption of the radiant heat. A second section 12 of the cooling surface area of the extended surface cooler 10 directly faces a face end area of the rotor 2 on the axial side. In this way, the heat emitted by the rotor 2 is also directly absorbed and removed by the extended surface cooler 10. The extended surface cooler 10 directly faces a bearing point of the rotor bearing 5 via a third section 16 of its cooling surface area.

Accordingly, due to the shape of the cooling surface area of the extended surface cooler 10, a shape of the extended surface cooler 10 adapted to the rotor 2 is formed, and so, due to the coolant, a maximum flow around the rotor 2 and the winding overhangs 15 as well as the rotor bearing 5 is made possible.

Due to the face-end arrangement of the extended surface cooler 10 on the electric machine, this additional effective direct cooling is easily retrofittable. The extended surface cooler 10 forms a self-contained component including the coolant inflow 18 and the coolant outflow 19 for the coolant. The coolant outflow 19 of the extended surface cooler 10 is connected to the third coolant hole 20 extending radially through the housing end wall 9. The third coolant hole 20 opens into the outflow hole 17 and forms, practically, the coolant outflow, which is shown, for example, in FIG. 3, so that the coolant can exit the wheel end of the axle drive via the outflow hole 17 and be fed to the liquid cooling.

The represented extended surface cooler 10 is provided here, by way of example, on a face end area of the housing 3 of the electric machine. It is readily conceivable, however, that the extended surface cooler 10 is also mounted on the other face end of the electric machine, in order to further increase the cooling. A water/antifreeze mixture is preferably utilized at the coolant.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 stator
2 rotor
3 housing
4 axis of rotation
5 first rotor bearing
6 second rotor bearing
7 cooling ducts
8 cooling bush
9 housing end wall
10 extended surface cooler
11 first section of a cooling surface area
12 second section of a cooling surface area
13 first coolant hole
14 second coolant hole
15 winding overhangs
16 third section of a cooling surface area
17 outflow hole
18 coolant inflow
19 coolant outflow
20 third coolant hole

The invention claimed is:

1. An electric machine of a vehicle, comprising:
a stator (1) and a rotor (2), which are arranged in a housing (3);
a liquid cooling jacket configured for cooling the stator (1); and
at least one extended surface cooler (10) connected to the liquid cooling jacket via a wall of the housing (3), the extended surface cooler (10) provided in an interior of the housing (3), the extended surface cooler (10) configured for direct cooling of components arranged in the interior of the housing (3),
wherein a coolant inflow (18) and a coolant outflow (19) of the extended surface cooler (10) are arranged at an end wall (9) of the housing (3) on a common circumferential path such that coolant flowing through the extended surface cooler (10) has a ring-segment shaped flow path, and the ring-segment shaped flow path of the extended surface cooler (10) extends around the rotor (2) by less than three hundred and sixty degrees on the common circumferential path.

2. The electric machine of claim 1, wherein the extended surface cooler (10) is arranged coaxially to an axis of rotation (4) of the rotor (2).

3. The electric machine of claim 1, wherein a first coolant hole (13) and a second coolant hole (14) are configured to supply coolant to the extended surface cooler (10), the second coolant hole (14) connected to the first coolant hole (13), the first coolant hole (13) connected to the liquid cooling jacket and extending axially through the wall of the housing (3), the second coolant hole (14) connected to the extended surface cooler (10) and extending radially through an end wall (9) of the housing (3).

4. The electric machine of claim 3, wherein the coolant outflow (19) of the extended surface cooler (10) is configured to discharge coolant, the coolant outflow (19) connected to a third coolant hole (20), the third coolant hole (20) extending radially through an end wall (9) of the housing (3) and opening into an outflow hole (17).

5. The electric machine of claim 1, wherein a first section (11) of a cooling surface area of the extended surface cooler (10) is positioned adjacent and directly faces winding overhangs (15) at an end face of the stator (1).

6. The electric machine of claim 5, wherein a second section (12) of a cooling surface area of the extended surface cooler (10) is positioned adjacent and directly faces an end face area of the rotor (2) on an axial side of the rotor (2).

7. The electric machine of claim 6, wherein a third section (16) of a cooling surface area of the extended surface cooler (10) is positioned adjacent and directly faces a bearing point of a rotor bearing (5, 6).

8. The electric machine of claim 1, wherein the at least one extended surface cooler (10) comprises a plurality of extended surface coolers (10), and a respective one of the plurality of extended surface coolers (10) is associated with each end wall (9) of the housing (3).

9. An axle drive for a vehicle, comprising at least one of the electric machine of claim 1.

* * * * *